Jan. 12, 1926.

A. B. CLARK ET AL 1,569,001

ELECTRICAL MEASURING APPARATUS

Filed Dec. 22, 1923  2 Sheets—Sheet 1

INVENTORS
*A.B. Clark and G. Crisson*
BY
ATTORNEY

Jan. 12, 1926.

A. B. CLARK ET AL 1,569,001

ELECTRICAL MEASURING APPARATUS

Filed Dec. 22, 1923     2 Sheets-Sheet 2

A = Crosstalk in miles without local by-pass.
B = Crosstalk with local by-pass.

INVENTORS
A. B. Clark and G. Crisson
BY
ATTORNEY

Patented Jan. 12, 1926.

1,569,001

UNITED STATES PATENT OFFICE.

ALVA BENSON CLARK, OF BROOKLYN, NEW YORK, AND GEORGE CRISSON, OF HACKENSACK, NEW JERSEY, ASSIGNORS TO AMERICAN TELEPHONE AND TELEGRAPH COMPANY, A CORPORATION OF NEW YORK.

ELECTRICAL MEASURING APPARATUS.

Application filed December 22, 1923. Serial No. 682,267.

*To all whom it may concern:*

Be it known that we, ALVA BENSON CLARK and GEORGE CRISSON, citizens of the United States, residing at Brooklyn and Hackensack, in the counties of Kings and Bergen and States of New York and New Jersey, respectively, have invented certain Improvements in Electrical Measuring Apparatus, of which the following is a specification.

This invention relates to electrical measuring apparatus and particularly to means for locating the cause of crosstalk between adjacent signaling circuits.

It is well known to those familiar with the art of electrical signaling, and, particularly telephony, that when a potential is applied to a circuit which is paralleled by the conductors of another circuit a difference of potential may be created in the paralleling circuit, due to the proximity of the two circuits and to irregularities in one or both circuits. The current which flows in the paralleling circuit is commonly known as crosstalk current.

It is the object of this invention to locate the position of the cause or causes of such crosstalk, that is, to determine the distance along the circuits from a predetermined point thereon.

Figure 1:
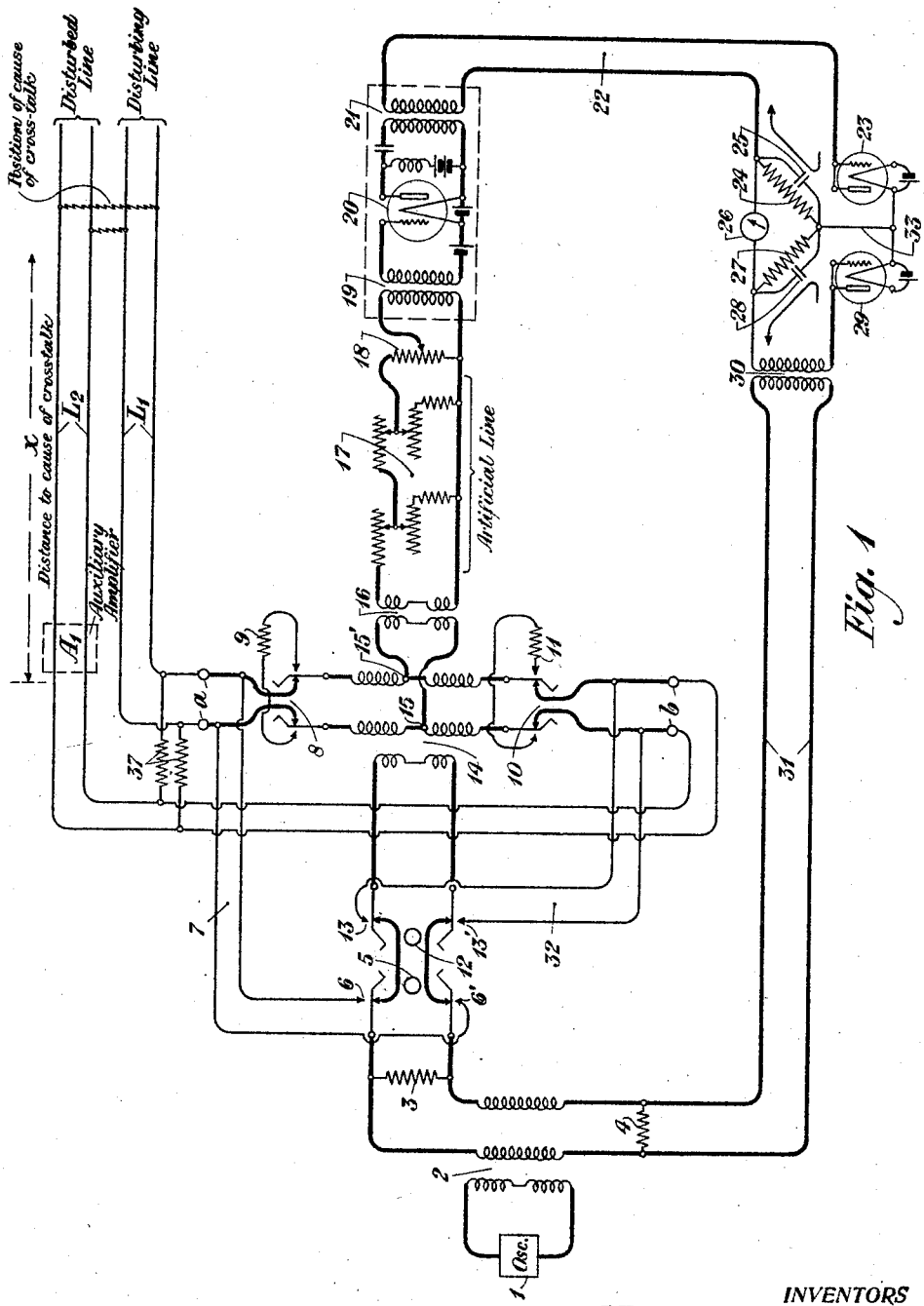
Figure 2:
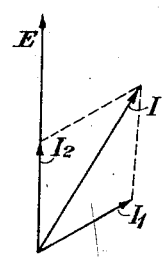
Figure 3:
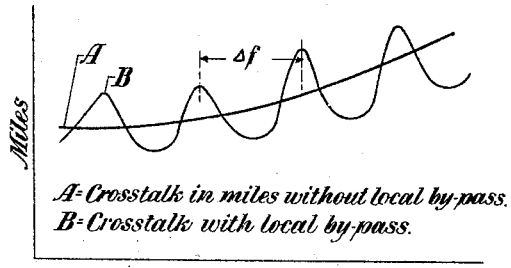
Figure 4:
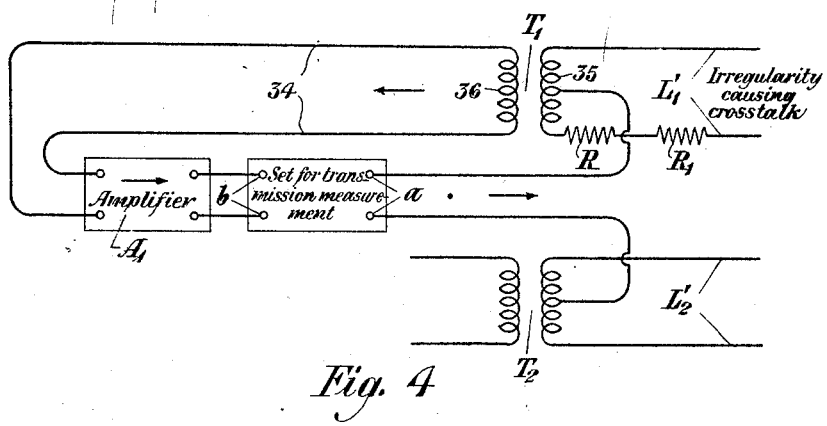
Figure 5:
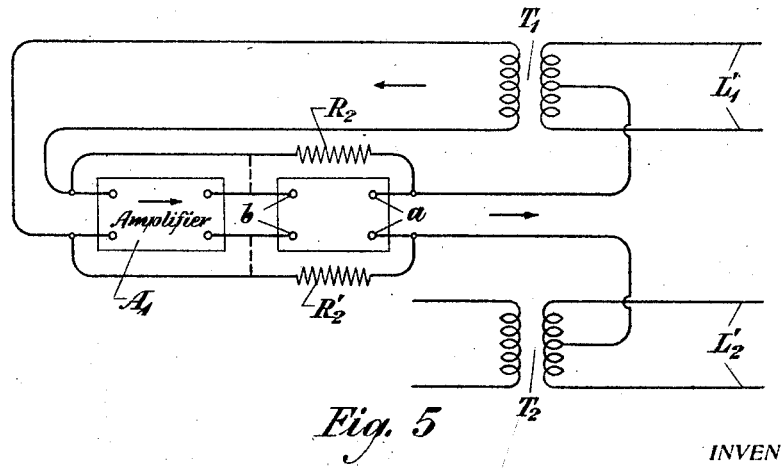

This invention will be clearly understood from the following description when read in connection with the attached drawing, of which Figure 1 shows one form of embodiment of the invention; Figs. 2 and 3 represent diagrammatically certain characteristics of the apparatus shown in Fig. 1 and Figs. 4 and 5 show variations of the invention.

In Fig. 1, $L_1$ and $L_2$ represent two circuits which are so disposed geographically that crosstalk current may be set up in line $L_2$ by current from the line $L_1$. These circuits are connected with the testing circuit at the terminals $a$ and $b$ respectively. The object of the invention is to determine the distance $x$ along the parallel circuits from the point where the testing apparatus is connected with the line circuits to the position of the source of the crosstalk.

The apparatus used is known in telephony as a transmission measuring set and the particular form disclosed here for the purpose of illustrating and describing the invention is that disclosed in the patent to A. B. Clark, No. 1,471,383, which issued on Oct. 23, 1923. In Fig. 1 a source 1 of sinusoidal oscillations is connected with the primary winding of the transformer 2, the secondaries of which are connected with the sides of a circuit which has bridged across it the resistances 3 and 4. The oscillator 1 may be of any well known type that may be adjusted to produce currents of predetermined frequencies throughout a predetermined range. The potential difference existing across the resistance 3 will cause a flow of current through the primary winding of the transformer 14 when the switches 5 and 12 are in their normal or unoperated positions. When switch 5 is operated current will flow over the conductors of pair 7 and thence over the conductors of the line $L_1$, which is connected with the testing circuit at the terminal $a$. The secondary windings of transformer 14 are connected with the movable arms of key or switch 8, the inside contact points of which are connected with the terminals $a$ of the test set and the outer contact points of which are connected with the resistance 9. In similar manner the opposite terminals of the said secondary windings of transformer 14 are connected with the movable arms of key 10, the inner contact points of which are connected with the terminals $b$ of the test set and the outer contact points of which are connected with the resistance 11, which differs in magnitude from the resistance 9. The conductors of pair 32 which are connected with the terminals $b$ of the test set are also connected with the outer contact points 13 and 13' of the switch 12. Bridged across the midpoints 15 and 15' of the secondary windings of transformer 14 is the pirmary winding of transformer 16, the secondary winding of which is connected with the artificial line 17. Bridged across what may be termed the output side of this artificial line is a potentiometer 18, which is connected with the primary winding of the transformer 19. The secondary winding of this transformer is connected with an amplifier, represented by the vacuum tube 20. This amplifier may, however, be of any substantially distortionless type and may comprise any number of stages of amplification. The output side of this amplifier is connected with the primary winding of transformer 21, the secondary winding of which is connected by means of pair 22 with a balance indicating system.

This system comprises a galvanometer 26 connected across two ends of equal and similar resistances 24 and 27, the other ends of which are joined together and connected with two electrodes, viz, the filaments of two vacuum tubes 23 and 29 which function as rectifiers. The said resistances 24 and 27 have connected in parallel therewith condensers 25 and 28 respectively. One of the conductors of pair 22 is connected with resistance 24 and the other with the grid and plate of the vacuum tube 23 which are strapped together to function as a single electrode. The reference circuit 31 is connected by transformer 30 with the resistance 27 and also with the grid and plate of the vacuum tube 29 which are strapped together. Two electrode tubes may, of course, be used in place of the three electrode tubes shown. These tubes rectify the alternating currents impressed thereon by the circuits 22 and 31 and the resulting direct currents flowing through the equal resistances 24 and 27 will, if unequal, cause a deflection of the galvanometer 26.

Another amplifier, represented by dotted lines and designated $A_1$, may be inserted in the line $L_2$ to amplify the crosstalk current flowing therein if it is felt that additional amplification is necessary.

The lines $L_1$ and $L_2$ are interconnected preferably at the point where these lines join the terminals of the test set by the equal resistances 37, which serve to feed back from line $L_1$ to $L_2$ a certain amount of current in phase with the voltage of the source 1, the purpose of which will be apparent from subsequent description.

To measure the distance to the source of crosstalk the circuit is arranged as follows: Switch 5 is operated to close contacts 6 and 6' to bridge the circuit 7 across the resistance 3 and switch 12 is operated to close contacts 13 and 13' to bridge the circuit 32 across the primary winding of transformer 14. Switches 8 and 10 are operated so as to connect the resistances 9 and 11 across the terminals of the secondary windings of transformer 14. With the switches thus arranged, the oscillator 1 is adjusted to produce a potential of a definite frequency which is applied across the winding of transformer 2 so as to cause current to flow through the resistances 3 and 4, thereby setting up potential differences across the said resistances. The potential difference across 3 will cause current to flow over the circuit 7 and the line circuit $L_1$. The potential difference across the resistance 4 will cause current to flow over circuit 31, which will be impressed by the transformer 30 upon the balance indicating system. Due to the rectifying action of the vacuum tube 29 a unidirectional current will flow over a circuit that may be traced from the filament of tube 29, conductor 33, resistance 27 in parallel with resistance 24 and galvanometer 26, the secondary winding of the transformer 30 and the plate and grid of vacuum tube 29. The grid and plate of each vacuum tube used in the balance indicating system are in effect a single electrode and are intended to represent the manner in which the ordinary three-element tube may be adapted for rectifying purposes. The flow of current through the galvanometer 26 would tend to cause a deflection thereof but this is prevented by the flow of current produced in the balance indicating system by circuit 22, the manner of doing which will be made clear.

If there is some irregularity crosstalk current will be set up in the line $L_2$. This current will flow over the line $L_2$ to the terminals $b$, thence over the circuit 32 and through the contacts 13 and 13' to the primary winding of the transformer 14. This current will be combined with a certain amount of current that flows from $L_1$ to $L_2$ over the by-pass circuit that includes the resistances 37. It should therefore be borne in mind that the current in the primary winding of transformer 14 is a combination of the crosstalk and of the by-passed currents, because certain subsequent effects depend upon this combination. Since keys 8 and 10 have been operated the resistances 9 and 11, which are unequal in magnitude, will be bridge across the terminals of the other windings of transformer 14. The unbalanced situation existing will cause a difference of potential across the points 15 and 15', which will cause the induced current to flow through the primary winding of transformer 16. The difference of potential established across the secondary winding of 16 will cause current to flow through the artificial line and through the potentiometer 18 and the magnitude of the current flowing through the primary winding of transformer 19 will be determined by the setting of the artificial line 17 and of the potentiometer 18. This current will be amplified by the amplifier 20 and will be impressed by transformer 21 upon the circuit 22. This current will be rectified by the tube 23 and the rectified current will flow through resistances 24 and 27 and through the galvanometer 26. The artificial line 17 should be adjusted until the rectified current from circuit 22 equals that from circuit 31, which will be indicated by a balanced condition of the galvanometer 26. The reading of the artificial line is the measurement in miles of standard cable of the relation between the sum of the crosstalk current in line $L_2$ and the by-pass current in resistance 37, and the current entering line $L_1$ for the frequency at which the oscillator is adjusted for this particular reading.

It will be seen that in making the measurement just described the transmission measuring set impressed a definite potential represented by the vector E in Fig. 2 upon the sending end of the disturbing line $L_1$. This causes current to flow over the disturbing line through the crosstalk path and back to the transmission set by way of the disturbed line $L_2$. Due to the length of this path and the finite velocity of propagation the current returning to the transmission set, which is represented by $I_1$ of Fig. 2, will lag behind the voltage by a certain angle, such as that between $I_1$ and E. If the lines $L_1$ and $L_2$ are completely separated from each other except at the point where the crosstalk occurs, that is to say, if there were no bridging connection such as 37 between $L_1$ and $L_2$, and the magnitude of this crosstalk current were measured, for example, in miles of standard cable at various frequencies, and a curve was plotted between frequency and miles, such curve would resemble that indicated by A of Fig. 3. The position and slope of this curve would depend upon the properties of the lines $L_1$ and $L_2$ and the nature of the crosstalk path.

In order to determine the distance $x$ from the point where the measurement is made to the location of the source of crosstalk a local by-pass circuit 37 effectively connecting the ends of the lines $L_1$ and $L_2$ is used. The exact nature of this by-pass circuit is not material to the performance of this measurement, except that it must not produce a phase shift which varies with the frequency of the current passing through it. When resistances are used, the current which passes through the by-pass circuit is in phase with the impressed voltage E. Such current is represented by the vector $I_2$ in Fig. 2. The current through the local by-pass circuit should be approximately equal in magnitude to the crosstalk current which reaches the transmission measuring set. It has been pointed out that if the crosstalk current is small an auxiliary amplifier $A_1$, represented by the dotted lines upon the circuit $L_2$, may be used to increase the crosstalk current. This amplifier, however, should not contain a filter or any other device which produces an appreciable amount of phase shift which varies with frequency. The transmission measuring set measures the resultant of the crosstalk current and the current through the by-pass circuit 37. As the frequency is varied the current in the by-pass circuit remains in phase with the applied voltage E but the current from the crosstalk circuit $L_2$ varies in phase with the frequency. Consequently, at some frequencies the currents add up, producing a low measured transmission equivalent, and at other frequencies these currents oppose, producing a relatively high measured equivalent.

It has been pointed out that the galvanometer 26 is acted upon simultaneously by a voltage due to the presence in resistance 27 of a rectified current from circuit 31, and by a voltage due to the presence in resistance 24 of a rectified current from circuit 22. By adjusting the artificial line 17, the currents in circuits 22 and 31 may be made equal and the galvanometer 26 brought to zero. If the oscillator 1 is operated at a plurality of frequencies throughout a definite range and the reading of the artificial line 17 when a balanced condition is obtained be noted for each frequency and if a curve be plotted between frequency and miles of transmission, such curve would have a series of humps, such as is shown by curve B of Fig. 3. If $V_1$ and $V_2$ are the velocities of propagation over the lines $L_1$ and $L_2$ respectively and $\Delta f$ is the frequency interval between the humps of curve B of Fig. 3, the distance $x$ from the measuring apparatus to the source of crosstalk is given by the formula $$x = \frac{V_1 V_2}{\Delta f (V_1 + V_2)}$$

In case the two circuits have the same velocity of propagation V, this formula becomes $$x = \frac{V}{2\Delta f}$$

which is the familiar formula for locating irregularities by means of the humps in an impedance curve.

Figs. 4 and 5 represent the method for locating the causes of crosstalk in phantom circuits, namely the crosstalk which exists between the phantom circuit and one of its side circuits. In these figures the transformers $T_1$ and $T_2$ are of the type known in telephony as phantom repeating coils. The phantom circuit is obtained by connecting directly with the midpoints of the line windings of the coils $T_1$ and $T_2$. If there were an irregularity such as is represented by the resistance $R_1$ in one side of one of the line circuits, such irregularity would cause crosstalk between the phantom circuit and this side circuit. This side circuit is connected through the pair 34 with the amplifier $A_1$ and thence with the terminals $b$ of the transmission measuring set. The other terminals $a$ of this set are connected with the midpoints of the line windings of the transformers $T_1$ and $T_2$. This transmission measuring set, which is the same as shown in Fig. 1, is adapted to apply a potential across the terminals $a$, which will cause a flow of current over the lines $L_1'$ and $L_2'$. Since there is an irregularity $R_1$ existing in the line $L_1'$ the currents flowing from the midpoint of the winding 35 of transformer $T_1$ to the two sides of the line $L_1'$ will be unequal and accordingly there will be induced in the winding 36 a potential resulting from the difference in magnitudes of these currents. This potential will cause a flow of current over circuit 34, which current is the crosstalk current. This current will be amplified by the amplifier $A_1$ and impressed across the terminals $b$ of the transmission measuring set.

In order to feed back a certain amount of current in phase with the potential of the testing source a resistance R is inserted in one of the conductors of the line $L_1'$, shown in Fig. 4. In Fig. 5 a feed-back connection containing two equal resistances $R_2$ and $R_2'$ is established between the output side of the transmission measuring set and the input side of the amplifier $A_1$. By thus feeding back a certain amount of the in-phase current and combining this with the crosstalk current a series of humps is created in the crosstalk curve, such as B of Fig. 3, by means of which the location of the cause of crosstalk may be determined by the formula given above.

Although this invention has been disclosed as embodied in a particular form it is to be understood that it is not limited to this form but is capable of embodiment in other forms without departing from the spirit and scope of the appended claims.

What is claimed is:

1. In a system for locating causes of crosstalk, the combination with a disturbing line circuit of a disturbed line circuit, the said circuits being characterized by a cause of crosstalk existing therebetween, a transmission measuring circuit connected with said line circuits and a by-pass connection between said line circuits.

2. In a system for locating causes of crosstalk, the combination with a disturbing line circuit of a disturbed line circuit, the said circuits being characterized by a cause of crosstalk existing therebetween, a by-pass connection between the said line circuits, a transmission measuring circuit connected with said line circuits arranged to measure the resultant of the crosstalk current and of the by-passed current created in the disturbed circuit, by the by-pass connection between the said line circuits.

3. In a system for locating causes of crosstalk, the combination with a disturbing line circuit of a disturbed line circuit, the said circuits being characterized by a cause of crosstalk existing therebetween, a transmission measuring circuit connected with said line circuits having a source of sinusoidal voltage connected therewith, and a by-pass connection between the said line circuits at or near the point of connection of the said measuring circuit to the said line circuits to produce a current in the disturbed circuit having a definite phase relation to the voltage of the said source, the measuring circuit being adapted to measure the resultant of the crosstalk current and the by-passed current.

4. In a system for locating causes of crosstalk, the combination with a disturbing line circuit of a disturbed line circuit, the said circuits being characterized by a cause of crosstalk existing therebetween, a transmission measuring circuit connected with the said line circuits having means for applying a sinusoidal voltage to the said disturbing circuit, and a by-pass connection between the said line circuits of such character as to transmit therebetween current having a constant phase relation to the applied voltage, the said measuring circuit having means to measure the resultant of the crosstalk current and the by-pass current.

5. In a system for locating causes of crosstalk, the combination with a source of sinusoidal voltage of a disturbing circuit connected with the said source and a disturbed circuit having a current set up therein by virtue of a cause of crosstalk existing between the said circuits, a by-pass connection between the said circuits of such character as to transmit therebetween currents having a constant phase relation to the impressed voltage, and a transmission measuring circuit containing two paths, one connected with the said disturbed circuit and the other connected with the said source, and a measuring arrangement connected with both paths comprising means to balance the crosstalk current combined with the by-passed current against the sinusoidal current from the said source of voltage.

6. In a system for locating causes of crosstalk, the combination with a source of sinusoidal voltage of a disturbing circuit connected with the said source and a disturbed circuit having current set up therein by virtue of a cause of crosstalk existing between the said circuits, a resistance by-pass connection between the said circuits at or near the point of connection of the said source with the said disturbing circuit, and a transmission measuring circuit containing two paths, one connected with the said disturbed circuit and the other with the said source, and a measuring arrangement connected with both paths, having means to oppose the crosstalk current combined with the by-passed current against the sinusoidal current from the said source of voltage.

7. In a system for locating causes of crosstalk, the combination with a source of sinusoidal voltage, of a disturbing circuit connected with the said source and a disturbed circuit having current set up therein by virtue of a cause of crosstalk existing between the said circuits, a by-pass connection between said circuits at or near the point of connection of the said source with the said disturbing circuit, the said by-pass being of such character as to transmit therebetween current in phase with the impressed voltage, and a transmission measuring circuit having a path connected with the said disturbed circuit and another path connected with the said source, the said measuring circuit having a differential measuring device to oppose the crosstalk current combined with the by-passed current against the sinusoidal current from the said source of voltage.

8. In a system for locating causes of crosstalk, the combination with a plurality of transmission circuits having a cause of crosstalk existing therebetween, of a transmission measuring circuit having a balance indicating device connected therewith, a source of testing voltage arranged to be connected directly with one of said transmission circuits and also with said balance indicating device, a resistance by-pass connecting said source with the other of said transmission circuits, means for applying to the said transmission measuring circuit the crosstalk current combined with the by-pass current from said source, and means for simultaneously applying to the said measuring circuit other current from the said source of testing voltage.

9. In a system for locating causes of crosstalk, the combination with a plurality of transmission circuits having a cause of crosstalk existing therebetween, of a source of testing voltage, a balance indicating device, switching means for aplying the said voltage to one of said transmission circuits and to said balance indicating device, switching means for applying to the said balance indicating device the crosstalk current set up in the other of said transmission circuits combined with a predetermined amount of current in phase with the voltage from said source of testing voltage, and current controlling means to equalize the currents applied to the said balance indicating device.

10. In a system for locating causes of crosstalk, the combination with a plurality of transmission circuits having a cause of crosstalk existing therebetween, of a source of testing voltage connected with one of said transmission circuits, a balance indicating device connected differentially with the said source and with the other of said transmission circuits, a by-pass connecting said source and said other of said transmission circuits whereby current in phase with the testing voltage may be combined with the crosstalk current, and means to equalize the currents impressed on the said balance indicating device.

11. The method of locating causes of crosstalk in an electrical transmission system comprising a plurality of parallel circuits having a cause of crosstalk existing therebetween which consists in applying a sinusoidal voltage of definite frequency to one of said circuits to produce crosstalk current in the other of said circuits, combining the said crosstalk current with sinusoidal current of definite magnitude and in phase with the said testing voltage, and measuring the transmission equivalent of the combined currents at various frequencies throughout a definite range.

In testimony whereof, we have signed our names to this specification this 21st day of December, 1923.

ALVA BENSON CLARK.
GEORGE CRISSON.